Patented June 30, 1936

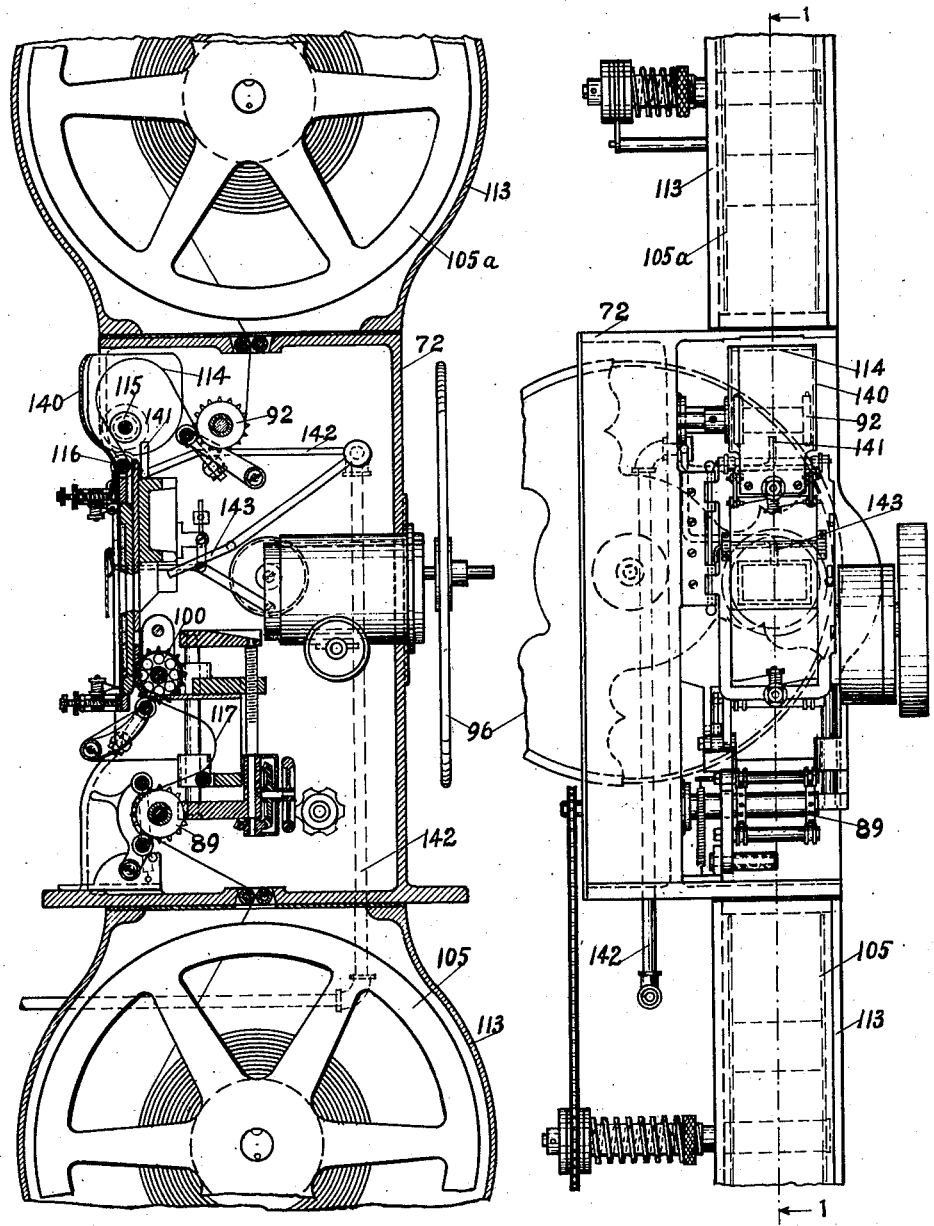

2,045,748

UNITED STATES PATENT OFFICE 2,045,748

FILM LOOP CONTROL FOR MOTION PICTURE MACHINES

Per Johan Berggren, New York, N. Y.

Original application December 20, 1928, Serial No. 327,200. Divided and this application May 5, 1933, Serial No. 669,518. Renewed December 13, 1935

5 Claims. (Cl. 88—18)

This invention relates to motion picture apparatus and with particularity to methods and means for controlling the feeding movement of a motion picture film through a projector.

An object of the invention is to provide methods and means which are simple and efficient for supporting and retaining a motion picture film steadily and stationarily in position opposite the projection aperture while the pictures are being projected therethrough.

A further object of the invention is to provide means to prevent breakage or injury to the film due to the jerking or snapping action exerted thereon by the intermittent film feeding mechanism.

A further object is to provide a pneumatic or other form of compressible support for the upper loop of the film to maintain a yieldable tension therein acting in opposition to the intermittent feed mechanism.

A feature of the invention relates to the novel organization and arrangement of elements which go to make up an economical and efficient film feeding mechanism for motion picture projectors.

The invention consists substantially in the construction, combination, location and relative organization of parts, all as will be more fully hereinafter set forth as illustrated in the accompanying drawing, and finally pointed out in the appended claims.

Other features and advantages of the invention not specifically enumerated will be apparent after a consideration of the following detail descriptions and the appended claims.

Referring to the drawing:

Figure 1 is a sectional view in elevation of a motion picture machine embodying the film threading and holding loop sustaining means according to the invention;

Fig. 2 is a left hand end view in elevation of the structure of Figure 1.

Referring more particularly to Fig. 1 there is shown a portion of a motion picture projecting machine generally, of known construction, comprising a lower film receiving or take-up reel 105, and an upper or film pay-off reel 105a. Each of these reels is provided with a suitable enclosing casing 113 and is attached respectively to the bottom and top of the projector casing 72. The film from the pay-off reel 105a is threaded through a slot in the top of the casing 72 and thence to and around the upper sprockets 92 which are adapted to be driven at a continuous rate of speed. The film after leaving the sprocket 92 is formed into an upper loop 114 and passes thence through guides 115, 116, through the film gate and past the projection aperture through which the picture frames are projected to the screen. After leaving the aperture the film passes around the sprocket device 100 which is adapted to be driven in an intermittent manner. After leaving the intermittent and drive sprocket 100 the film is formed into the lower loop 117 and passes thence around the lower sprocket device 89 which is continuously rotated. After leaving the sprocket 89 the film passes through a slit in the bottom of the projector casing and is received on the receiving reel 105. By means of the driving mechanism disclosed in detail in application Serial No. 327,200, the upper and lower film feed devices 92 and 89 respectively are continuously driven to effect a continuous feed of the film, while the intermittent feed device 100 is actuated intermittently to cause the portion of the film which extends between the upper and lower loops 114, 117 to be actuated step-by-step. This step-by-step feed causes the pictures on the film to be successively brought into framed position with reference to the projection aperture where they are arrested and held stationary so that each picture during its period of rest will be thrown onto the screen. The upper and lower loops 114 and 117 of course permit the step-by-step feed of the intermittent portion of the film without interference with the continuous feeding action of the upper and lower feed devices 92 and 89. In accordance with well known practice the feeding action of the several devices 92, 100, 89 is effected by the engagement of sprocket teeth in marginal holes formed in the film tape.

The above description sets forth the ordinary way in which a film tape is threaded through a motion picture projecting machine. Due to the intermittent action of the sprocket 100 the same draws upon the surplus length of film afforded by the upper loop and pays it out into the lower loop 117. Ordinarily the upper loop 114 is formed in the film at a point between the delivery side of the upper continuous feed sprocket 92 and the point where the film enters the film gate. Theoretically the upper loop bows upwardly in a uniform curve as said loop is being formed by the feeding action of the upper sprocket device during the time a picture is projected onto the screen, that is during the time the portion of the film which occupies the gate remains stationary. Theoretically, also, the action of the intermittent feed device 100, should cause a uniform shortening of the radius of the loop when said intermittent feed device is in operation and draws upon this loop. This ideal or theoretical action is never attained in practice. On the contrary, in actual practice with apparatus heretofore employed the loop forms itself into an elongated irregular shaped curve, building up a sharpened bend at which point the film frequently breaks in two when the stress of the sharp snapping action of the intermittent feed device is imposed thereon. This snapping action is in the nature of a sharp whip like jerk or snap. Even if the film is not broken under the effect of this sharp snap, said snap sets up a reaction in that portion of the film which occupies the gate and which extends across the aperture. This reaction tends to move or shift the film or cause it to jump, thereby varying or altering its distance of the picture from the lens and hence altering its focus. This also tends to cause a jump or unsteadiness in the picture through both vertical and lateral or sidewise movement. This causes a most undesirable flicker or movement of the projected picture on the screen. A great deal of effort and ingenuity have been expended in the endeavor to overcome and eliminate this most serious difficulty, but, so far as I am aware these efforts have not resulted in a successful solution of the problem. In accordance with my present invention I have provided a yielding support for the upper loop in the film which permits the loop to retain its efficient regularly curved contour, while at the same time being uniformly yieldable under the influence of the action of intermittent feed device. By providing an elastic yieldable support for the loop, the said loop is maintained under a degree of tautness, while being acted upon by the intermittent feed, which prevents the snapping or whipping action of the latter thereon, thereby avoiding breakage of the film and preventing the reaction referred to, and the resultant unsteadiness, movement and loss of focal distance. In carrying out this idea of an elastic yieldable loop support it is important to avoid the use of anything which would mar or injure the film surface when applied thereto. I propose to employ for this purpose a compressible medium, such, for instance as a body of air which I have found to be one practical medium for the purpose. In carrying out my invention in one practical embodiment thereof, I deliver one or more jests of the compressible medium air, for example, and preferably at a point within the loop at approximately the midwidth of the film. I have found excellent results in this respect are secured by enclosing the loop within a chamber formed by side walls but with an open top. In the drawing the walls of the chamber or enclosure are indicated at 140, and the air jet at 141, the air or other medium being supplied to the jet by pipe connections 142, from any suitable source, as for example, and in the unitary self contained organized apparatus hereinbefore described, from the air compressor 69. The film width itself constitutes the top closure for the chamber, and the transverse width of the film is such as to enable the film to feed through without frictional contact of its edges with the inner surface of the side walls of the chamber. By this arrangement the air body delivered under pressure from the jet spreads transversely across the film within the loop thereby affording an efficient cushion support for the film throughout its entire transverse width. It is important to avoid back pressure, and hence I utilize the film width itself to constitute the top closure or dome for the chamber. The action is two-fold. The velocity of the air delivered from the jet will act as a one point support for the film while the enclosed chamber makes possible the utilization of the air volume itself as a cushioning medium throughout the whole inner surface of the loop. By reason of the elastic and yieldable nature of this support the intermittent feed action is allowed to function without causing any whipping or snapping of the loop, and hence the portion of the film held within the gate is held steady and without alteration or derangement of the focus. By utilizing the air volume throughout the entire area of the loop an inertia is built up tending to prevent distortion of the loop, as well as the production of any laterally waving motion. Moreover, injury to the surface of the film is also entirely avoided since there is nothing except the air flow to come in contact therewith.

In connection with the use of an air jet as an elastic and yieldable cushion support for the upper loop of the film, I have also shown an air jet 143, for delivering a jet of air under pressure against the film while in the gate in order to prevent any movement of the film while the pictures thereon are being projected on to the screen. I do not claim this feature, however, as it does not form part of my invention.

While one specific manner of applying the air cushion to sustain the loop is disclosed in the drawing, it will be understood that the invention is not limited thereto. Furthermore, if desired an air cushion may be applied to the lower loop 117 as well, although this is not absolutely necessary. Furthermore, while an air cushion has been disclosed for sustaining the loop, it will be understood that any other compressible medium exhibiting like properties may be employed.

Various other changes and modifications may be made without departing from the spirit and scope of the invention.

This application is a division of application Serial No. 327,200, filed December 20, 1928.

What is claimed is:

1. In a motion picture projecting apparatus including continuously and intermittently operating film feeding devices, the film being formed into a free loop intermediate said devices, and means for delivering a compressible gaseous medium within said loop to form an elastic cushion support therefor.

2. A motion picture apparatus including continuously and intermittently acting film feeding devices, the film being formed into a free loop intermediate said devices in combination with means to deliver air under pressure into said loop to form a yielding cushion support for the latter.

3. In a motion picture apparatus continuously and intermittently acting film feeding devices, the film being formed into a free loop intermediate said devices, a casing having enclosing side walls within which said loop is formed and means to deliver air under pressure within said loop to form a yieldable compressible support for said loop.

4. In a motion picture apparatus continuously and intermittently acting film feeding devices, the film being formed into a free loop intermediate said devices, a casing having enclosing side walls within which said loop is formed and means to deliver air under pressure within said loop to form a yieldable compressible support for said loop, said air pressure being delivered at a point midway the transverse width of the film.

5. In a motion picture projecting apparatus, the combination comprising a film gate having an exposure aperture, means for intermittently drawing a film through said gate, means for forming the film into a loop before it reaches the gate, and means for directing a stream of gaseous medium against the under surface of the loop to support and steady it.

PER JOHAN BERGGREN.